Nov. 9, 1965   R. J. BOUCHARD ETAL   3,216,698
HIGH PRESSURE PLUG VALVE HAVING PARTICULAR SEALING ARRANGEMENT
Filed Feb. 7, 1962

INVENTORS
ROBERT JOHN BOUCHARD
EDWARD EZRA GITLIN
BY

Attorneys

United States Patent Office 3,216,698
Patented Nov. 9, 1965

3,216,698
HIGH PRESSURE PLUG VALVE HAVING PARTICULAR SEALING ARRANGEMENT
Robert J. Bouchard, Salina Star Rte., and Edward E. Gitlin, 952 Arapahoe St., both of Boulder, Colo.
Filed Feb. 7, 1962, Ser. No. 171,630
7 Claims. (Cl. 251—317)

This invention relates to a valve particularly suited for use as a temperature resistant, high pressure plug valve.

A variety of plug valves are in use which usually are employed as cut off valves for liquids maintained under low pressures and which are not subjected to unusually high or low temperature conditions. In general, the difficulty of maintaining a close enough fit between the plug portion and seat to confine high pressure fluids and to be operative under extreme high and low temperature has discouraged the use of plug valves under such conditions.

Accordingly, it is an object of this invention to provide an improved plug-type valve, which functions efficiently under both high and very low temperature conditions and without malfunction; which is efficient in high pressure systems; and which is very simple in construction, yet extremely durable in extended and continuous usage.

Another object of our invention is to provide a simple, durable and efficient plug-type valve utilizing a tapered seat and thrust bearing formed of material possessing cold flow characteristics which encapsulates the valve plug and flows sufficiently under thrust exerted by the plug toward its narrower end to effectively seal against leakage of fluid even when maintained under high pressure.

A further object of our invention is to provide a durable and efficient plug-type valve arranged to be installed in a line conducting low temperature or high temperature fluids and which utilizes an arrangement permitting inspection, removal or replacement of operative parts without removal of the valve body from its operating location.

Other objects reside in novel details of construction and novel combinations and arrangement of parts, all of which will be set forth in the course of the following description.

A plug valve according to this invention includes a thick walled, hollow body portion arranged for in line interconnection with sections of a fluid conduit. A stepped recess is formed substantially centrally of the valve body and extends transversely to the flow passage through the valve body. The first or upper wall portion of said recess may be suitably threaded for reception of a stem bushing and the central portion of the recess is substantially cylindrical and arranged for aligning with the flow passage through the valve body.

A valve plug having a substantially frustoconical, tapered portion is fitted within the seat insert in substantially complete contact throughout its lengthwise or verical extent by thrust exerted by the threaded bushing. The tapered portion has a transverse port disposed to align with the opposed openings in the seat in its valve opening position and to move into contacting relation with imperforate portions of the seat in the valve closing position. The bottom of the valve plug, below the frustoconical portion, may include a projection which is arranged for seating at the inner end or bottom of an innermost stepped portion of the recess formed in the body. The valve plug includes a stem portion which extends upwardly through the stem bushing for manipulation exteriorly of the valve body. A deformable thrust washer is disposed to bear against the lower surface of the stem bushing so as to seal and maintain the frusto-conical contact to the interior of the seat insert.

In order to maintain the desired pressure seal, the plug and valve body are preferably made of a relatively hard material which is essentially rigid, whereas the seat insert and thrust washer are of a somewhat softer material which possesses certain desirable features, particularly "cold flow" characteristics.

The practice of our invention will be described with reference to the accompanying drawings illustrating representative structural arrangements. In the drawings, in the several views of which like parts bear similar reference numerals:

Figure 1:
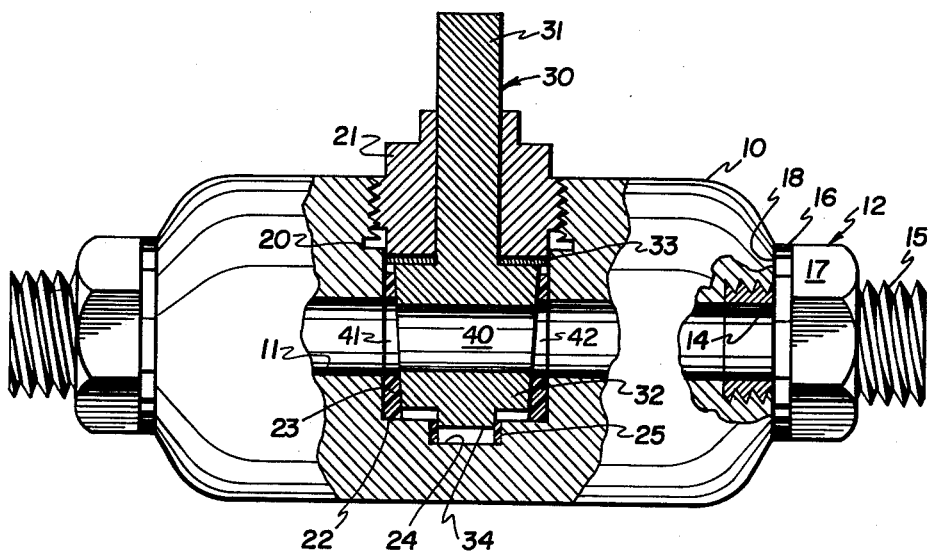
FIG. 1 is a side elevation, in partial section, of an embodiment of our invention, showing the interior arrangement of parts.
Figure 2:
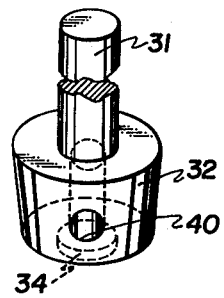
FIG. 2 is an isometric view of the plug which is used in the embodiment shown in FIG. 1.

A plug valve of the type shown in the drawings may be used for lines conducting various types of fluids, such as semi-solids, liquids and gases; and is characterized by an unrestricted through-flow which is equal to the rating of the valve. That is, a one inch valve has unrestricted through-passage of one inch diameter and there is a minimum of restriction as compared to other plug type valve and passage arrangements. The valve assembly shown in FIG. 1 includes an elongated hollow body 10 having a longitudinal passage 11 extending from end to end preferably along its central axis. The ends of the passage 11 are internally threaded for reception of a nut and nipple assembly 12, which includes externally threaded nipple portions 14 and 15. Portion 14 is mounted within the body 10 and portion 15 extends outwardly from the end of passage 11 for interconnection with the fluid conduit in which the valve is to be used. A washer 16 is disposed between a nut 17 and a flattened end surface 18 of the valve body to assure a fluid-tight seal between the threaded members.

A stepped recess extends through body 10 substantially perpendicular to passage 11 with one end contained in body 10 and the other opening through its periphery. The uppermost or entrance portion of recess 20 is internally threaded and arranged for reception of a stem bushing 21. An intermediate stepped portion 22 of slightly smaller diameter than the entrance serves as a support for a seat member 23 which is locked against rotation, or held by a friction fit therein when used in a low pressure installation. The third or lowermost stepped portion 24 is substantially smaller in diameter than the intermediate portion 22 and contains an annular gasket 25. When the valve is assembled, a valve plug 30 is arranged to be encapsulated within the valve. The term encapsulate as used herein refers to the sealing of the plug within the valve body so as to close those paths through which pressurized fluids would otherwise escape to the atmosphere. This plug includes a stem portion 31 extending through the stem bushing 21 and secured to or formed integrally with an intermediate tapered plug portion 32 and a central projection 34 on the inner end of the intermediate portion fits recessed portion 24 and its contained gasket 25. A thrust washer 33 possessing cold flow characteristic seats at the top or outer end of plug 32 and completes the encapsulation of the plug. A transverse passage 40 in plug 32 is adapted to be moved into concentric relation with passage 11 by rotation of stem 31. The foregoing arrangement permits service or replacement of the working parts of the valve without removing the valve body from the line in which it is installed when line flow can be terminated upstream of said valve.

As shown in FIG. 1, the passage 40 through the plug is slightly smaller in cross section and diameter than the aligned apertures or ports 41 and 42 formed through the opposed walls of the seat member 23 and the cross sectional area or dimension of the linear flow passage 11 through the valve body. The diameter of the passage is the rating of the valve and the flow of material in seat member 23 changes the effective diameter of ports 41 and 42 under thrust from bushing 21 so that the through-flow of the valve is equal to the rating of the valve.

The valve plug and valve body are preferably made of a hard material such as a metal, while the seat insert is preferably fabricated of a tetrafluoropolyalkene, such as polytetrafluoroethylene, polytrifluorochloroethylene, etc. and for some uses "nylon" may be satisfactory. Some of these materials can be bonded to the adjoining metallic surfaces, but usually mechanical locking will be preferable to facilitate replacement as required. Of course, other materials may be used which will provide the desired plasticity or cold flow characteristics when arranged to respond to pressure applied to it by mechanical means such as by thrust exerted by bushing 21 moving plug 32 into fluid sealing relation to the seat member 23 and such movement also results in flowing washer 33 into passage sealing position. When pressure is so applied to the plug 32, it is transmitted radially, causing flow of the plastic material which effects a positive seal between the valve plug 32, the cylindrical wall of the recess and the seat member 23. It has been generally understood, previous to the instant invention, that material having cold flow characteristics, such as described above, was not suited for use as valve seats. However, we have discovered that by having the valve plug completely encapsulated within a seat member formed from such material, its use is highly beneficial.

For test purposes, a valve substantially as shown in FIG. 1 was incorporated as a shut-off valve in a gaseous nitrogen system operating under 3,000 lbs. per square inch gauge pressure and at ambient temperature conditions. After the valve was in the system for approximately eight hours, no malfunction or leakage could be detected. In another test operation, the same valve was incorporated as a shut-off valve in a liquid nitrogen system in which the operating temperature of the liquid was minus 320° F. and the operating pressure was 150 lbs. per square inch gauge. After approximately eight hours of cycling, the seat insert rotated 90° in the valve body. To overcome this malfunction, seat locating pins were fitted to mechanically lock the seat in operative position relative to the valve body. The valve was returned to the system and operated for an additional sixteen hours. No malfunction or leakage was observed after locking the seat and performance of the valve was entirely satisfactory.

In a third test, the same valve was incorporated as the shut-off valve in a hydraulic system under a working pressure of 3000 lbs. per square inch gauge pressure with surges up to 4500 lbs. per square inch gauge. The temperature of the system was approximately 120° F. The valve was used in the system for approximately sixteen hours and was cycled at least fifty times during the period. In the latter test wherein the valve was used as the shut-off valve in the hydraulic system, it was found that the operating temperature was maintained approximately 10° F. lower than when using the system valves under similar conditions.

The valve construction of this invention may be varied to provide a multi-port turret or indexing valve as by forming a plurality of passages, 90° apart, through the plug and seat insert, or by having 6 ports 60° apart, or any other desired even numbered porting arrangement.

Additionally, if so desired, a passage may be bored halfway through the plug in the horizontal plane and have such a passage perpendicularly intersect an upwardly directed passage bored from the bottom of the plug, thereby allowing passage through a corresponding port or ports in the valve body. It is likewise possible, utilizing the concepts of this invention, to have a plurality of arrangements of ports and passages in various horizontal planes so as to form banks to thus provide a gang valve.

Figure 4:
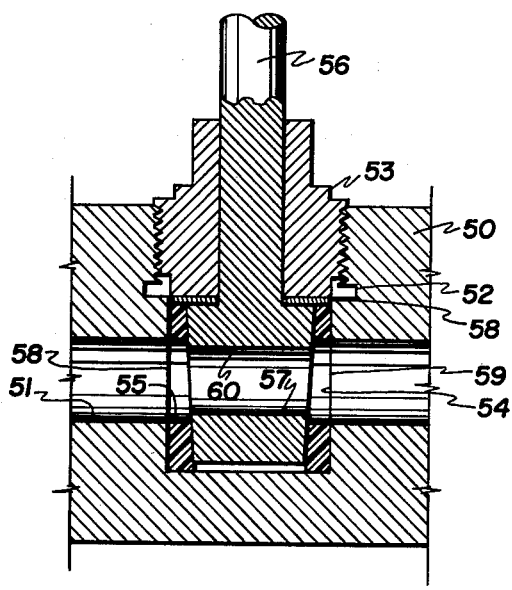
FIG. 4 is a fragmentary vertical section of an alternative plug valve assembly embodying features of this invention.
Figure 3:
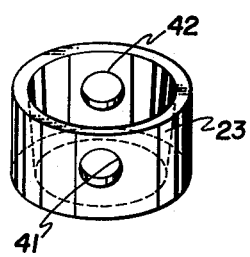
FIG. 3 is an isometric view of the seat insert which is used in the embodiment shown in FIG. 1.

The arrangement shown in FIG. 4 is another embodiment incorporating features of this invention and is shown as a fragmentary portion of an elongate valve body 50 similar in all respects to body 10 of FIG. 1 including a flow passage 51 extending along its central axis. A two-stepped, single entrance recess is formed through the walls of the valve body, the upper or outer one 52 being the larger and internally threaded for reception of the complementary threading on a stem bushing 53. The second stepped portion 54 of the recess adjoins recess portion 52 and is smaller in diameter and arranged for reception of the seat insert 55 which is secured against rotation therein. A valve plug including an outer stem portion 56 and an inner tapering plug section 57 is mounted in the seat insert. A thrust washer or pressure plate 68 possessing cold flow characteristics is fitted on the stem bushing 53 to enclose the plug 57 and the seat insert 55 and complete the encapsulation of the plug. The seat insert 55 has opposed aligned ports 58 and 59 similar in all respects to those described with reference to FIG. 3. A passage 60 is formed through the truncated portion of the stem plug and is arranged for alignment with the ports 58 and 59 in the seat insert and the passage 51 when the plug is rotated by stem 56. The seat insert 55 is suitably fixed against rotation in the recess portion 54 and allows relative rotation of the plug 57.

It will be understood that the structural embodiments shown and described herein are typical of the various types of valves useful in the practice of our invention. One of the essential and distinctive features of our invention is the provision of a single entrance area for the operating parts of the valve, and this entrance may be covered or sealed by any suitable mechanism that provides the necessary force against the plug and rotation of the plug for flow control. Thus, a nut, screw or threaded plate might be substituted. The threaded arrangement has proven satisfactory and with the total encapsulation of the plug as previously described, the operating parts are effectively sealed against leakage.

In this connection, any seepage which might occur is contained within the recess, as there is no flow path for its escape to the entrance opening and periodic testing or tightening of the threaded bushing, as occurs in continuous operation, will terminate such seepage. This arrangement provides extreme strength and an almost infinite adjustment of the force applied to the plug and its cold flow enclosure. Therefore, changes and modifications may be availed of within the scope of our invention as set forth in the hereunto appended claims.

We claim:

1. A plug valve for controlling flow of high and low temperature fluids, comprising a rigid body having a contained passage for continuous flow of fluid from an inlet in one wall of the body to an outlet in another wall thereof distant from said inlet, a stepped recess intermediate the ends of said body disposed in substantially perpendicular relation to a portion of said body passage and including a wider portion opening through a wall of the body and a narower adjoining portion extending inwardly therefrom substantially beyond said passage and terminating within the body, means on the body for connecting the inlet of the passage in a fluid conducting line, means on the body for connecting the passage outlet in a fluid conducting line, an annular seat member fitted in the inner end of the recessed portion and having openings aligned with upstream and downstream portions respectively of said valve passage, said seat member being formed of a plastic composition possessing cold flow characteristics and having a tapering internal surface, a tapered plug fitted in the seat member and formed of a material harder than said seat member, said plug having a passage adapted to be aligned with said upstream and downstream portions of the valve passage in one position of its rotation, a stem on the plug extending outwardly through the recessed portion beyond the body for rotation of the plug within the seat, a sealing member of a diameter corresponding to and fitted in the narrower recessed portion, closure means for the open end of said recess through which said stem extends constructed and arranged to exert thrust on the sealing member and force the plug against the seat member so that the sealing member and seat member provide a double-layer seal for sealing the plug passage from the exterior of the body through the narrower recess.

2. A plug valve for controlling flow of high and low temperature fluids, comprising a rigid body having a contained passage for continuous flow of fluid from an inlet in one wall of the body to an outlet in another wall thereof distant from said inlet, a stepped recess intermediate the ends of said body disposed in substantially perpendicular relation to a portion of said body passage and including a wider portion opening through a wall of the body and a narrower adjoining portion extending inwardly therefrom substantially beyond said passage and terminating within the body, means on the body for connecting the inlet of the passage in a fluid conducting line, means on the body for connecting the inlet of the passage in a fluid conducting line, means on the body for connecting the passage outlet in a fluid conducting line, an annular seat member fitted in the inner end of the recessed portion and having openings aligned with upstream and downsteam portions respectively of said valve passage, said seat member being formed of a plastic composition possessing cold flow characteristics and having a tapering internal surface, a tapered plug fitted in the seat member and forced of a material harder than said seat member, said plug having a passage adapted to be aligned with said upstream and downstream portions of the valve passage in one position of its rotation, a stem on the plug extending outwardly through the recessed portion beyond the body for rotation of the plug within the seat, a thrust bearing disposed at the outer end of said plug fitted in the narrower recess portion and formed of a material possessing cold flow characteristics, closure means adjustably mounted in the open end of said recess through which said stem extends and having a portion in thrust relation to said thrust bearing and said plug for directing said plug in wedging engagement with said seat and said thrust bearing against said narrower recess portion, said thrust bearing and seat member thereby providing a double seal for sealing the plug passage from the exterior of the body through the narrower recess.

3. A plug valve for controlling flow of high and low temperature fluids, comprising a rigid body having a contained passage extending for continuous flow of fluid from an inlet in one wall of the body to an outlet in another wall distant from said inlet, a stepped recess in the body disposed in substantially perpendicular relation to a portion of said passage and including a wider portion opening through the wall of the body and a narrower adjoining portion extending inwardly therefrom substantially beyond said passage and terminating within the body, means on the body for connecting the inlet of the passage in a fluid conducting line, means on the body for connecting the passage outlet in a fluid conducting line, an annular seat member fitted in the inner end of the recessed portion and having openings aligned with upstream and downstream portions respectively of said valve passage, said seat member being formed of polytetrafluoroethylene and having a tapering internal surface, a tapered plug fitted in the seat member and formed of a material harder than said seat member, said plug having a passage adapted to be aligned with said upstream and downstream portions of the valve passage in one position of its rotation, a stem on the plug extending outwardly through the recessed portion beyond the body for rotation of the plug within the seat, a sealing member of a diameter corresponding to and fitted in the narrower recessed portion, closure means for the open end of said recess through which said stem extends constructed and arranged to exert thrust on the sealing member and force the plug against the seat member so that the sealing member and seat member provide a double-layer seal for sealing the plug passage from the exterior of the body through the narrower recess.

4. A plug valve for controlling flow of high and low temperature fluids, comprising a rigid body having a contained passage extending for continuous flow of fluid from an inlet in one wall of the body to an outlet in another wall distant from said inlet, a stepped recess in the body disposed in substantially perpendicular relation to a portion of said passage and including a wider portion opening through the wall of the body and a narrower adjoining portion extending inwardly therefrom substantially beyond said passage and terminating within the body, means on the body for connecting the inlet of the passage in a fluid conducting line, means on the body for connecting the passage outlet in a fluid conducting line, an annular seat member fitted in the inner end of the recessed portion and having openings aligned with upstream and downstream portions respectively of said valve passage, said seat member being formed of polytrifluorochloroethylene and having a tapering internal surface, a tapered plug fitted in the seat member and formed of a material harder than said seat member, said plug having a passage adapted to be aligned with said upstream and downstream portions of the valve passage in one position of its rotation, a stem on the plug extending outwardly through the recessed portion beyond the body for rotation of the plug within the seat, a seal fitted in the narrower recessed portion and superposed on the upper surface of said plug, closure means for the open end of said recess through which said stem extends constructed and arranged to exert thrust on the sealing member and force the plug against the seat member so that the sealing member and seat member provide a double-layer seal for sealing the plug passage from the exterior of the body through the narrower recess.

5. A plug valve for controlling flow of high and low temperature fluids, comprising a rigid body having a contained passage for continuous flow of fluid from an inlet in one wall of the body to an outlet in another wall distant from said inlet, a stepped recess in the body disposed in substantially perpendicular relation to a portion of said passage and including an internally threaded, wider portion opening through the wall of the body and a narrower adjoining portion extending inwardly therefrom substantially beyond said passage and terminating within said body, means on the body for connecting the inlet of the passage in a fluid conducting line, means on the body for connecting the passage outlet in a fluid conducting line, an annular seat member fitted in the inner end of the recessed portion and having openings aligned with upstream and downstream portions respectively of said valve passage, said seat member being formed of a plastic composition possessing cold flow characteristics and having a tapering internal surface, a tapered plug fitted in the seat member and formed of a material harder than said seat member, said plug having a passage adapted to be aligned with said upstream and downstream portions of the valve passage in one position of its rotation, a stem on the plug extending outwardly through the recessed portion beyond the body for rotation of the plug within the seat, a bushing in threaded connection with the threaded portion of the recess and having a bore through which the stem extends, a thrust washer possessing cold flow characteristics disposed between the bushing and the plug, said bushing having a portion in thrust relation to said thrust washer and said plug for directing said plug in wedging engagement with said seat and said thrust washer against said narrower recess portion, said thrust washer and seat member thereby providing a double seal for sealing the plug passage from the exterior of the body through the narrower recess.

6. A plug valve for controlling flow of high and low temperature fluids, comprising a rigid body having a contained passage for continuous flow of fluid from an inlet in one wall of the body to an outlet in another wall distant from said inlet, a stepped recess in the body disposed in substantially perpendicular relation to a portion of said passage and including a wider portion opening through the wall of the body and a narrower adjoining portion extending inwardly therefrom substantially beyond said passage and terminating within said body, means on the body for connecting the inlet of the passage in a fluid conducting line, means on the body for connecting the outlet passage in a fluid conducting line, an annular seat member fitted in the inner end of the recessed portion and having openings aligned with upstream and downstream portions respectively of said valve passage, said seat member being formed of a material possessing cold flow characteristics and having a tapering internal surface, a tapered plug fitted in the seat member and formed of a material harder than said seat member, said plug having a passage adapted to be aligned with said upstream and downstream portions of the valve passage in one position of its rotation, a stem on the plug extending outwardly through the recessed portion beyond the body for rotation of the plug within the seat, a sealing member of a diameter corresponding to and fitted in the narrower recessed portion, adjustable means closing the open end of said recess for exerting a force on said plug for directing said plug in wedging engagement with said slot member and said sealing member against said narrower recess portion, said seat member and sealing member thereby sealing the plug in the body to contain said fluids passing through the plug passage for sealing the open end of said recess through which said stem extends.

7. A plug valve for controlling flow of high and low temperature fluids, comprising an elongated body having a lengthwise passage extending from end to end, a stepped recess in the body disposed in substantially perpendicular relation to said passage and including a wider portion opening through the wall of the body and a narrower adjoining portion extending inwardly therefrom substantially beyond said passage and terminating within the body, means at each end of said body for connecting the passage in a fluid conducting line, an annular seat member fitted in the inner end of the recessed portion and having opposed openings held in alignment with said passage, said seat member being formed of a plastic composition possessing cold flow characteristics and having a tapering internal surface, a tapered plug fitted in the seat member and formed of a material harder than said seat member, said plug having a passage adapted to be aligned with said upstream and downstream portions of the valve passage in one position of its rotation, a stem on the plug extending outwardly through the recessed portion beyond the body for rotation of the plug within the seat, a sealing member disposed at the outer end of said plug fitted in the narrower recess portion and formed of a material possessing cold flow characteristics, adjustable closure means for the open end of said recess through which said stem extends and having a portion directly bearing on said sealing member in thrust relation to said sealing member and said plug for directing said plug in wedging engagement with said slot and said sealing member against said narrower recess portion so that the sealing member and seat member provide a double-layer seal for sealing the plug passage from the exterior of the body through the narrower recess.

References Cited by the Examiner

UNITED STATES PATENTS

| | | | |
|---|---|---|---|
| 477,605 | 6/92 | Pratt | 251—316 |
| 2,893,429 | 7/59 | Schaffer | 251—317 X |
| 2,954,961 | 10/60 | Stogner | 251—316 X |
| 3,100,501 | 8/63 | Hansen et al. | 137—454.6 |

FOREIGN PATENTS

| | | |
|---|---|---|
| 1,055,693 | 10/53 | France. |
| 1,192,348 | 4/59 | France. |
| 1,247,640 | 10/60 | France. |
| 316,746 | 8/29 | Great Britain. |

ISADOR WEIL, *Primary Examiner.*

M. CARY NELSON, *Examiner.*